E. SCHRODER.
MANUFACTURE OF FLEXIBLE METAL HOSE.
APPLICATION FILED JAN. 13, 1917.
1,407,001.  Patented Feb. 21, 1922.
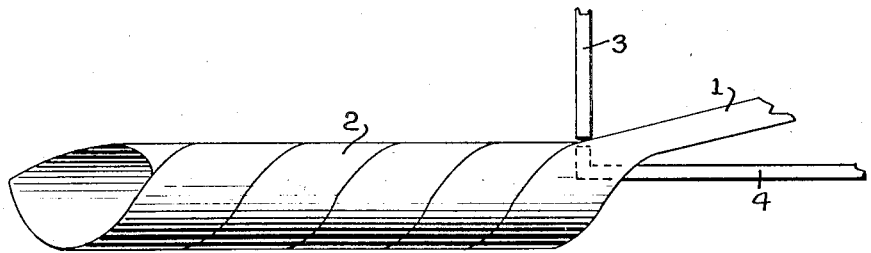
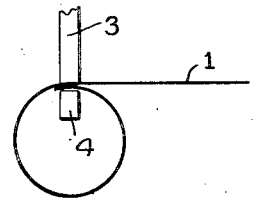
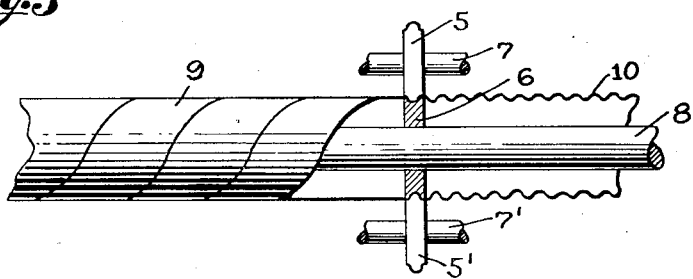

UNITED STATES PATENT OFFICE.

EDMUND SCHRÖDER, OF BERLIN, GERMANY, ASSIGNOR, BY MESNE ASSIGNMENTS, TO THE CHEMICAL FOUNDATION, INC., A CORPORATION OF DELAWARE.

MANUFACTURE OF FLEXIBLE METAL HOSE.

1,407,001.

Specification of Letters Patent.  Patented Feb. 21, 1922.

Application filed January 18, 1917. Serial No. 143,283.

*To all whom it may concern:*

Be it known that I, EDMUND SCHRÖDER, a subject of the German Emperor, and resident of Berlin, in the German Empire, have invented certain new and useful Improvements in the Manufacture of Flexible Metal Hose, of which the following is a specification.

Flexible metal hose has heretofore been manufactured by coiling a metal band of appropriate profile around a mandrel, the packing material needed to render the hose tight having been subjected to a similar procedure. In order to economize such material in certain cases, the spiral seam at the joining edges of the coiled metal band was autogenously welded. The autogenous welding process was accomplished by flanging the joining edges of the metal band and subsequently flattening by welding the spiral-shaped collar thus formed. The process is tedious as well as expensive and does not permit carrying out the welding operation at places other than the outer sides of the profile, the welded seam being thus rather easily damaged.

These and other disadvantages are overcome by my invention which utilizes electrical welding in lieu of autogenous welding. There is produced first by aid of an appropriate type of electrical welding machine a practically smooth, spirally welded tube from a metal band without profile. The metal band tube is then provided with a profile of a shape rendering the tube flexible, that is, forming it into a flexible metal hose. The profile may be produced either immediately after welding the metal band, or at any desired time thereafter, and it may be formed either as a spiral groove or as spiral grooves arranged in parallel, or as a series of annular grooves, as may be desired or preferred.

In the accompanying drawing there is shown diagrammatically an illustrative embodiment of my invention in which drawing—

Figure 1 is a perspective view showing the formation of a web of metal into a tube;

Figure 2 is a side elevation of the same; and

Figure 3 shows, partly in section and partly in elevation, one form of profiling means.

In accordance with the foregoing embodiment of my invention, a web of metal 1 (Figure 1) is continuously formed into a tube 2 having the edges of the web overlapping and forming a spirally arranged joint when welded by means of suitably positioned electrodes, as for instance, the electrodes 3 and 4. The upper electrode 3 serves the double function of conducting the current and exerting an amount of pressure sufficient to insure a good weld, whereas the lower electrode 4 conducts the current and acts as a mandrel to oppose the pressure exerted by the upper electrode 3. The web may be of any desired length since the arrangement of the electrodes admits the formation of tubes of any length inasmuch as said electrodes do not impede the manipulation of the metal strips.

The desired profile may be given to the tube in any suitable manner, as for instance, by the profiling means illustrated in Fig. 3. The tube 9 is fed between outer male profiling rolls 5 and 5′ and an inner female profiling roll 6, all of said rolls being suitably fashioned and co-acting to force the tube into a series of spiral grooves, as illustrated at 10. The outer rolls 5 and 5′ are mounted upon suitable shafts 7 and 7′, respectively, and the inner roll 6 upon the shaft 8, said shafts being preferably geared together in order to avoid slipping.

The above-described procedure affords advantages not attainable in the methods for manufacturing flexible metal hose as practiced heretofore. In addition to the advantages already mentioned, my improved method possesses a peculiar advantage in that it employs electrical welding. The work is in this case largely independent of the workman's skill and proceeds more quickly. Finally, the edges of the metal band overlap each other at the welded seam and the seam is, in consequence thereof, tighter and more durable.

It is preferable to form the profile immediately after welding the metal band in order to utilize the greater pliability of the metal in consequence of the higher temperature which it has attained during the welding operation, but the formation of the profile may be a separate step in the method and additional heating may be employed to make the metal sufficiently pliable.

My improved method renders practicable the manufacture of flexible metal hose of greater length than hitherto, and in an uninterrupted process, in contradistinction to the old step-by-step method.

I claim:

1. The method of manufacturing flexible metal hose, consisting in spirally winding a smooth metal band, uniting the overlapping edges of the band by electric welding so as to form the band into a tube, and providing the thus produced tube with a profile adapted to render it flexible.

2. The method of manufacturing flexible metal hose, consisting in spirally winding a smooth metal band and simultaneously uniting the overlapping edges of the band by electric welding so as to form the band into a tube, and providing the wall of the tube thus produced with a profile running around the tube and adapted to render it flexible.

3. The method of manufacturing flexible metal hose, consisting in spirally winding a smooth metal band and simultaneously uniting the overlapping edges of the band by electric welding so as to form the band into a tube, and providing the wall of the thus produced tube with a profile running spirally around the tube and adapted to render it flexible.

4. The method of manufacturing flexible metal hose, consisting in winding spirally a smooth metal band, uniting the overlapping edges of the band by electric welding so as to form the band into a tube, and providing the wall of the thus produced tube immediately after welding with a profile adapted to render the tube flexible.

5. The method of manufacturing flexible metal hose, which comprises winding a substantially smooth metal band into a substantially spiral form with the adjacent edges overlapping, welding the overlapping edges so as to form a substantially continuously welded joint, and thereafter profiling the welded tube to render the same flexible.

6. The method of manufacturing flexible metal hose, which comprises winding a substantially smooth metal band into a substantially spiral form with the adjacent edges overlapping, welding the overlapping edges so as to form a substantially continuously welded joint, and shortly thereafter, and before the heat of the welding operation has entirely disappeared, profiling the welded tube to render the same flexible.

In witness whereof I have hereunto signed my name this twenty-fifth day of October 1916, in the presence of two subscribing witnesses.

EDMUND SCHRÖDER.

Witnesses:
HENRY HASPER,
ALLEN F. JENNINGS.